Patented Aug. 5, 1941

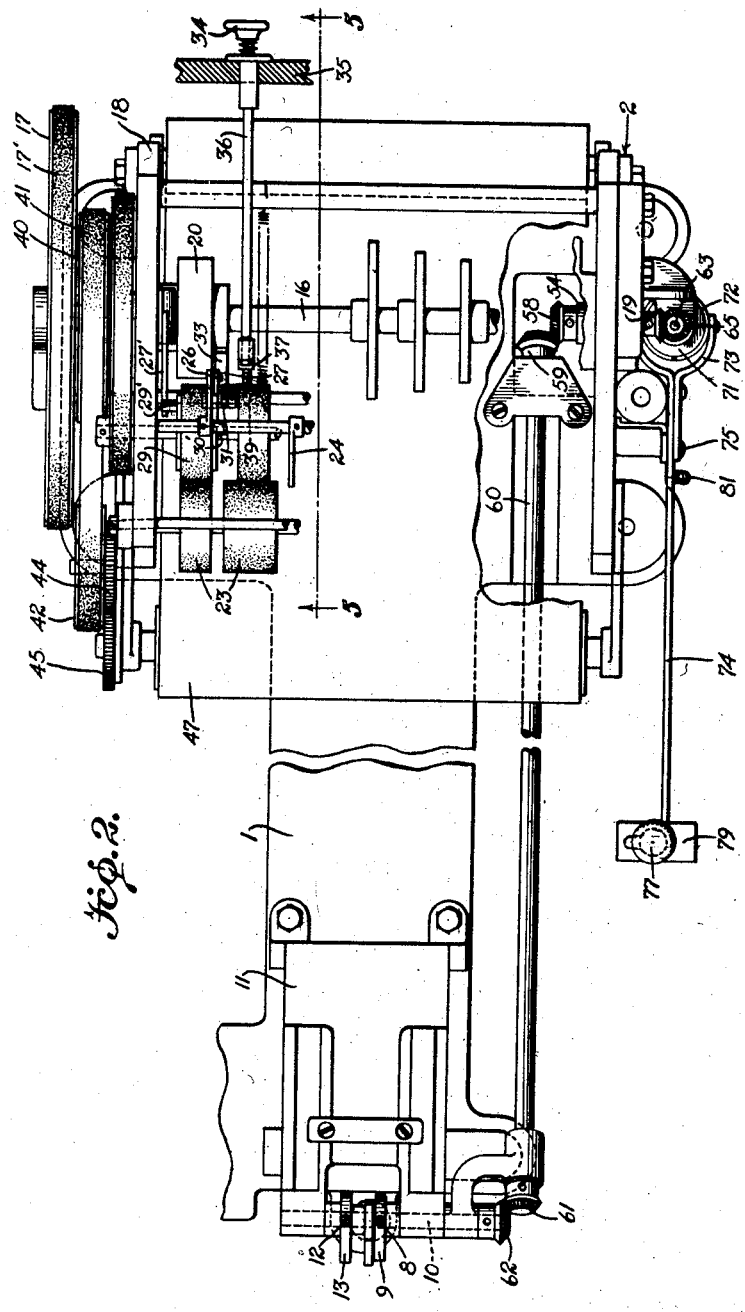

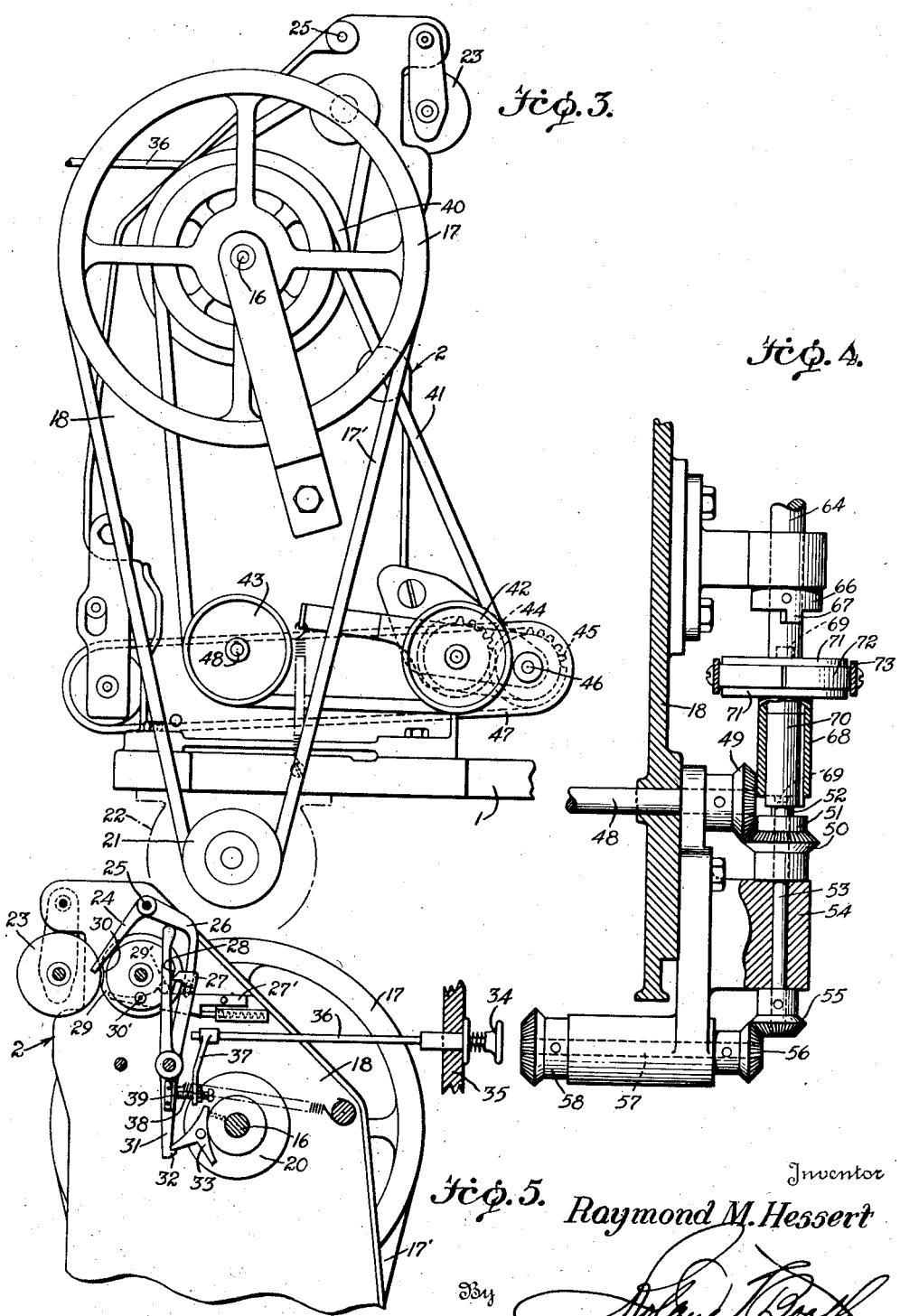

2,251,570

UNITED STATES PATENT OFFICE 2,251,570

DOCUMENT PHOTOGRAPHING MACHINE

Raymond M. Hessert, Audubon, N. J.

Application August 10, 1939, Serial No. 289,355

2 Claims. (Cl. 88—24)

The invention relates to document photographing machines having a camera, means for feeding documents past the camera for photographing and mechanism that secures the feed of documents and operation of the camera in timed relation.

The invention comprehends the provision of a document photographing machine which is provided with a variable speed drive mechanism operated by a prime mover, such as an electric motor, with suitable control of the drive mechanism to secure operation at one speed of the entire machine automatically through one complete cycle each time a document is inserted for photographing, and by operating said control to secure operation of the camera at a different speed while the document feed mechanism remains idle. The operation of the camera alone is usually at a higher speed, and is for the purpose of winding the lead strips at each end of the film strip on the film spools or a portion of opaque coated film on exposed film in a convenient and expeditious manner.

In the drawings:

Fig. 2 is a plan view of the machine as illustrated in Fig. 1 with portions broken away and other portions omitted for convenience in illustration.

Fig. 3 is a side elevation of the opposite side of the document feed mechanism from that shown in Fig. 1.

Fig. 4 is a horizontal cross section taken on line 4—4 of Fig. 1.

Fig. 5 is a vertical cross section taken on line 5—5 of Fig. 2.

Figure 1:
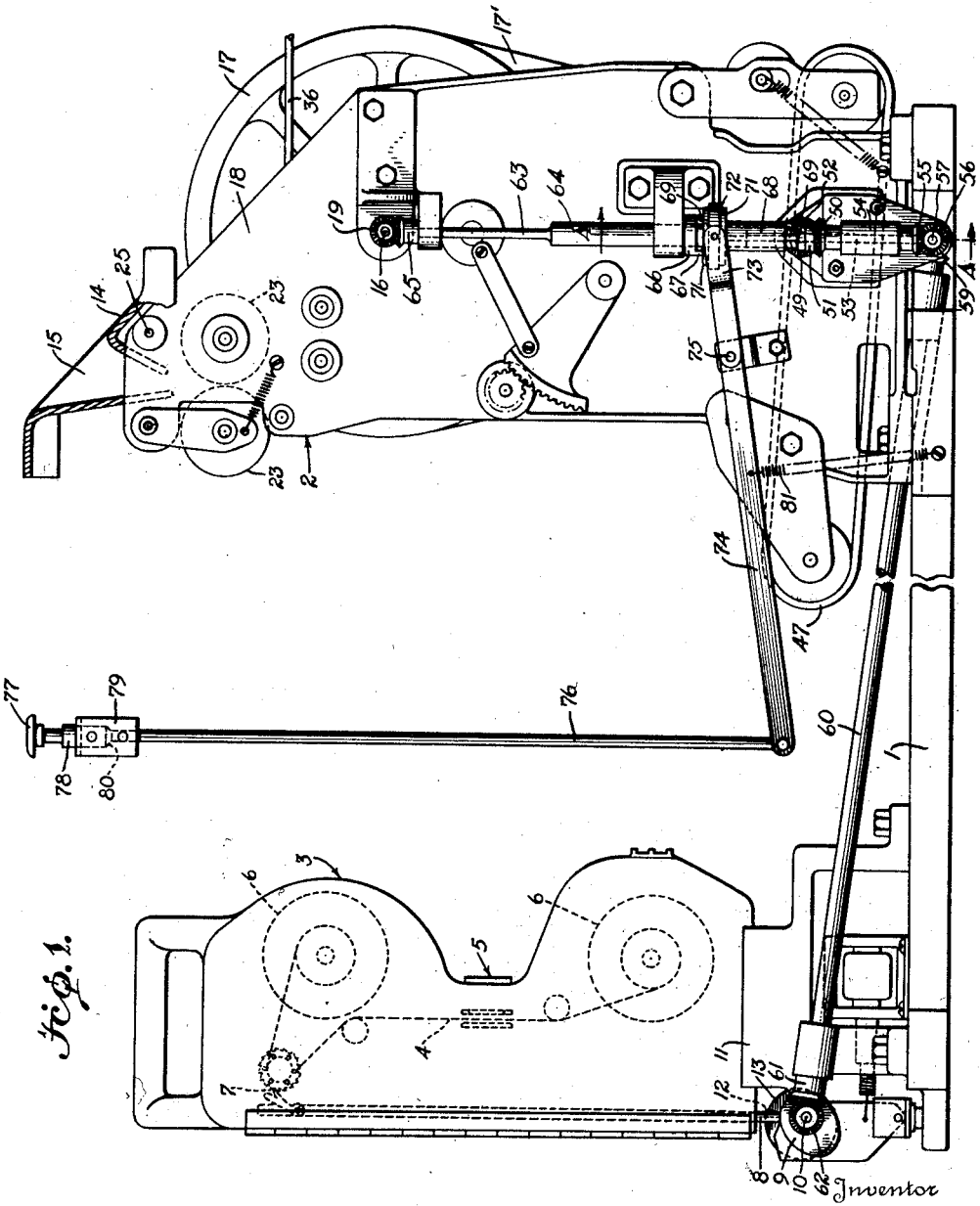
Fig. 1 is a side elevation showing the document photographing machine, with the casing omitted showing the drive mechanism for operating the camera and document feed mechanisms in unison and the control for shifting the drive to obtain individual operation of the camera.

The invention is shown applied to a document photographing machine particularly adapted for photographing both faces of checks, but it is to be understood that it may be applied to any type of document photographing machine.

The casing for the document photographing machine and some parts of the mechanism are omitted for convenience in illustration where they are not essential to the disclosure of the invention claimed.

The document photographing machine illustrated, includes a base 1 having a document feeding mechanism 2 mounted on one end thereof and a camera 3 mounted on the other end.

Camera 3 includes the usual mechanism for photographically recording on a film strip 4, by means of a suitable optical system in which part of the mounting structure is indicated at 5. Film spools 6 are adapted for detachable mounting in the camera in a well known manner for carrying the film so that it may be unwound from one spool and wound upon the other. Suitable film feeding mechanism generally indicated at 7 is provided for feeding the film in the camera in a manner well known in the art, the film feeding mechanism indicated being of the pawl and ratchet type.

Film feed mechanism 7 is operated by a reciprocating bar 8 carried by camera 3 and actuated by cam 9 mounted on shaft 10 rotatably mounted in bearings carried by supporting structure 11 mounted on base 1. The shutter of the optical system, not shown, is actuated by another bar 12 similar to bar 8 which is also slidably mounted in camera 3 in back of bar 8 as illustrated in Fig. 1. Bar 12 is actuated by cam 13 also mounted on shaft 10.

It will be understood that any suitable camera, film feeding mechanism and optical system constructed according to principles and with mechanism well known in the art, may be used in connection with the construction and operation of camera 3.

A portion of the outer casing for the machine is indicated at 14 in Fig. 1, portion 14 being part of the top structure of the casing formed to provide slot 15 where documents, such as checks, are introduced into the machine to be received and conveyed through the machine by document feeding mechanism 2. During the feeding of the checks through the machine by the document feeding mechanism they are positioned in the focal plane of the camera for photographing upon film 4. Document feeding mechanism 2 as illustrated, is adapted to turn the checks over during their course of travel through the mechanism so that both faces of the checks are photographed on film 4.

The mechanism for feeding and reversing the checks is only partially illustrated in the drawings. This mechanism consists essentially of a construction as shown in Hessert Patent No. 1,939,446, December 12, 1933. Since the specific structural detail of the document feeding mechanism and its manner of construction and operation is not material to the invention covered in this application, illustration is made of only those portions of the mechanism as are necessary to the disclosure of the invention. The mechanism shown in the above mentioned patent or any other suitable document feeding mechanism of a character well known in the art may be used for the document feeding mechanism 2 as shown in the drawings. It is only necessary to mount the document feeding mechanism and the camera in such a relation that the documents will be positioned in the focal plane of the camera for photographing as they pass the camera.

The document feeding mechanism illustrated includes main drive shaft 16 having a pulley 17 mounted on one end beyond supporting frame structure 18 while beveled gear 19 is mounted on the opposite end beyond frame 18. This main drive shaft is formed in separate co-axial sections, pulley 17 being mounted on a short section of the shaft which is connected to the remaining section carrying beveled gear 19 by means of a conventional clutch mechanism indicated at 20 in Fig. 2. Pulley 17 is driven by belt 17' from pulley 21 carried by the shaft of electric motor 22 shown in Fig. 3, which provides the source of power or prime mover for the machine.

Clutch 20 is the main controlling clutch for the operation of the machine to photograph a check or similar document. All of the operative mechanism of the machine is operated or controlled from the section of shaft 16 operated by clutch 20, the cycle of operation of the machine being similar to that shown and described in the aforementioned patent.

The control of clutch 20 in document feeding mechanism 2, as illustrated, while including the use of substantially the same mechanism disclosed in the aforementioned patent, has such mechanism arranged in a slightly different manner as shown in Fig. 5, wherein feed rolls 23 arranged on two parallel shafts in pairs coact to receive a check inserted into slot 15, grip the checks between the peripheries of said rolls and feed the checks downwardly therebetween into photographing position. The gripping and feeding of a check or similar document by feed rolls 23 causes the check or other document to operate control finger 24 so as to rock shaft 25 for moving arm 26 in a counterclockwise direction as illustrated in Fig. 5, thereby moving pawl 27 in a clockwise direction to disengage the end thereof from stop shoulder 28 of roll 29 rotatably mounted on the shaft with one set of feed rolls 23. Roll 29 includes a cut-out portion 30 arranged to provide for free rotation of an opposite feed roll 23 in the cut-out portion.

As soon as feed rolls 23 receive and grip a check or similar document for feeding into the machine, the release of roll 29 by dog 27 disengaging shoulder 28 immediately provides for the rotation of roll 29 by means of spring operated dog 27' engaging pin 29' on roll 29, rotating roll 29 to engage its periphery with the check between it and roll 23 opposite. Roll 29 is then caused to rotate through one revolution. An operating pin 30' on the opposite side of roll 29 from pin 29' is arranged to engage trip lever 31 for moving it in a clockwise direction on its pivot thereby disengaging lower end 32 thereof from clutch dog 33 carried by clutch 20, providing for the release of clutch 20 so the clutch parts will move into engagement for driving the longer section of shaft 16 from the section of the shaft driven by pulley 17.

This secures one rotation of longer shaft section 16 through the operation of clutch 20 and moves all parts of the document photographing machine through one cycle of operation for one photographing operation to photograph the front and back of a check or similar document. This operation in photographing the front and back of a check is obtained in the manner described in the above mentioned patent, in which the front of a check is photographed in one cycle of operation and the back of the same check is photographed in the next cycle of operation as described in said patent.

It will be understood that as soon as a check passes beyond trip finger 24, the finger is restored to its position as shown in Fig. 5 by suitable spring actuation, while levers 27 and 31 are similarly toward their original position for operation to stop the rotation of rollers 29 and clutch 20 respectively as they complete one revolution. Fin 29' engages spring operated dog 27' as it completes its rotation through one revolution to restore said dog 27' to its normal position under tension on pin 29' as dog 27 has the end engage shoulder 28 for arresting rotation of roll 29 at its starting position. This places the parts in position for a repeated operation upon the insertion of another check or document into slot 15.

A cycle of operation of the machine can also be obtained by manual control, as well as by means of a document as above described. This manual operation of the machine is obtained by pressing the control button 34 inwardly toward the casing of the machine, a portion of which is disclosed at 35 in Fig. 5. Button 34 is mounted on operating rod 36 carrying an arm 37 at the inner end in depending relation provided at its lower end with an operating screw 38 adapted for adjustment to properly position its free end to engage projection 39 on lever 31. By pressing button 34 inwardly shaft 36 is moved inwardly or rearwardly in the machine operating lever 31 in a clockwise direction of rotation disengaging end 32 from dog 33 and releasing clutch 20 for operation.

Upon release of button 34, suitable springs return the button to its normal position shown in Figure 5, whereupon end 32 on lever 31 moves into the path of dog 33 and actuates the clutch to stop rotation of shaft 16 at the end of a cycle of operation of the machine. Obviously, if the button 34 is held inwardly by manual operation thereof for a period of time, the machine will run continuously completing successive cycles of operation of the machine without stopping. Whenever the button is released the machine will be stopped at the end of a cycle of operation.

A pulley 40 is mounted on the short section of shaft 16 for continuous rotation with pulley 17. Pulley 40 is of smaller size than pulley 17 and drives belt 41 which in turn drives pulleys 42 and 43, respectively, as clearly shown in Fig. 3. Pulley 42 is mounted on a stub-shaft carrying gear 44 meshing with gear 45 carried on shaft 46, carrying a roller mounted for supporting and driving endless conveyor belt 47. Belt 47 receives documents after they are photographed for delivering them from the machine. Pulley 43 is mounted on shaft 48 extending across the document feeding mechanism and projecting beyond the other side of frame 18 as shown in Fig. 4, where it mounts beveled gear 49.

Beveled gear 49 intermeshes and drives beveled gear 50 carried by clutch collar 51. Clutch collar 51 is provided with a projection 52 forming a clutch shoulder for operation in a manner that will be hereinafter described. Clutch collar 51 is rotatably mounted on shaft 53. Shaft 53 is rotatable in bearing 54 carried by frame 18. The lower end of shaft 53 is provided with a beveled pinion 55 meshing with beveled pinion 56 on shaft 57, also carried in bearing member 54, at right angles to shaft 53, as illustrated in Fig. 4. The opposite end of shaft 57 carries a beveled pinion 58 meshing with pinion 59 on camera drive shaft 60 rotatably mounted in suitable bearings. Shaft 60 extends rearwardly at the bottom of the machine and has beveled gear 61 on the rear end thereof meshing and driving beveled gear 62 mounted on the end of shaft 10.

A vertical drive shaft 63 formed to provide a section of enlarged diameter at 64 is rotatably mounted in suitable bearings carried by frame 18. The upper end of shaft 63 carries beveled gear 65 meshing with beveled gear 19 on main drive shaft 16. Near the lower end of shaft 63 on the enlarged portion 64 thereof, is mounted a clutch collar 66 having a clutch projection 67 similar to projection 52 on clutch collar 51. Projection 67 extends toward projection 52 as they are arranged in opposed relation and spaced apart a suitable distance so clutch control sleeve 68 having clutching projections 69 on opposite ends thereof may be positioned to have one of the said projections engaged with either projection 52 of clutch collar 51 or projection 67 of clutch collar 66.

Clutch sleeve 68 is slidably mounted by means of a suitable key on enlarged end 70 of shaft 53 so that whenever clutch sleeve 68 is driven by one of said clutch collars it will in turn rotate shaft 53 and drive the camera mechanism through shaft 60. Clutch sleeve 68 has a pair of spaced flanges 71 providing an annular groove or slot for receiving clutch shoes 72 therein between said flanges. Clutch shoes 72 are pivotally secured to yoke 73 on clutch operating lever 74 pivotally supported at 75 on supporting structure 18.

The opposite end of lever 74 has clutch operating rod 76 pivotally attached thereto, the upper end of rod 76 is provided with an operating knob 77 while an enlarged portion 78 adjacent said knob is guided in brackets 79 carried by the casing of the machine. Bracket 79 is formed with a key-hole slot in which the smaller end of the slot is adapted to receive rod 76 while the shoulder formed at the bottom of enlarged section 78, indicated at 80, is adapted to rest on top of bracket 79 when rod 76 is moved into the small end of the slot in order to hold clutch sleeve 68 in its lower position for maintaining the clutch projection on the lower end thereof in engagement with clutch projection 52 of clutch collar 51. A spring 81 normally retains clutch sleeve 68 at its upper limit of movement with the projection on the upper end thereof positioned to engage clutch projection 67 so that clutch sleeve 68 is operated by means of clutch collar 66 through the rotation of shaft 63 from main drive shaft 16.

In view of the above description it will be understood that clutch sleeve 68 being normally retained in its uppermost position operates to drive the camera film feeding mechanism and other parts thereof by means of motion transmitted through shaft 60 to shaft 10 only when the longer section of shaft 16 is operated by means of clutch 20. In this operation of the machine it will be understood that the entire mechanism moves through one cycle of operation for each document fed into the machine. The speed of rotation of the various shafts and the sizes of the gears used are such that the camera operation is properly timed with the operation of the document feeding mechanism whereby a photograph of the document is taken in a manner well known in the art.

The provision of clutch sleeve 68 together with the other clutch parts to form a complete clutch mechanism is arranged so that by manually operating knob 77 to pull rod 76 upwardly and seat shoulder 80 on bracket 79 in the small portion of the key-hole slot therein, lever 74 is actuated to move clutch sleeve 68 downwardly to disengage the upper projection from clutch projection 67 of collar 66 and to engage lower projection 69 with projection 52 of clutch collar 51. This secures driving of shaft 53 by means of motion transmitted through shaft 48 from pulley 17, pulley 40 and belt 41, driving pulley 43 on shaft 48. Since pulley 40 is continuously rotating with pulley 17 whenever the motor is in operation, it will be obvious that upon the operation of shaft 53 from shaft 48, it will be driven continuously from pulley 17 without respect to the operation of clutch 20 and during a time when clutch 20 is retained by its control mechanism in disengaged relation.

As a result, shaft 53 may be driven when document feeding mechanism 2 is idle so that camera operating shaft 60 is rotated for operating the camera mechanism to feed film 4 through the camera.

This operation of the camera mechanism independently of the document feed mechanism through the medium of shaft 48 is a highly desirable feature because it provides for the feeding of the opposite end portions of the film onto and off of the respective spools and saves wear in the operation of the machine. As well known in the art, it is customary to provide lead strips on the opposite ends of the film that is now in use in document photographing machines. This provides for the loading of the cameras in numerous instances without the use of a dark room although these lead strips are also used when it is necessary to load the camera in the dark room. These lead strips are not provided with a sensitized coating for photographing purposes and it is therefore necessary to wind the lead strips onto and off of the spools when opposite ends of the film are reached so that the film may be conveniently inserted and removed from the camera. It is usually customary to use the lead strip in threading the film into the camera when a new roll of film is being inserted, the end of the lead strip being connected to the empty spool after it is threaded through the feed mechanism of the camera.

As soon as this operation is completed, in a manner well known in the art, the camera is closed and placed in the machine, as shown in Fig. 1, whereupon button 77 may be operated to obtain the drive of the film feed mechanism without operating the document feed so as to wind the lead strip off of the spool filled with film and onto the empty spool. Button 77 is then operated to position clutch sleeve 68 in its upper position as soon as the film strip is ready for photographing documents. Then, after all of the film is photographed in the usual operation of the machine at which time the camera mechanism is driven by means of shaft 63 through the control of clutch 20, button 77 can again be operated to drive the film mechanism from shaft 48 to feed the lead strip at the opposite end of the film onto the spool carrying the exposed film for subsequent removal from the camera. These lead strips are usually made from opaque material in order to protect the film against the action of any light that might destroy the exposed film while the spool is being handled prior to development.

The pulleys 40 and 43 are so proportioned that the shaft 48 is driven at a considerably faster speed than the shaft 63. Accordingly the film feeding shaft 60 is operated at a greater speed when driven by the shaft 48 than when it is normally driven by the shaft 63. This is for the purpose of obtaining a faster winding of the lead strip on and off of the spools in order to save time in the operation of the document photographing machine.

In the structure illustrated shaft 48 drives the film feeding mechanism at approximately twice the feed obtained from the drive through shaft 63. It is to be understood, however, that by arranging the gearing connections with shaft 48 this variation in speed of drive can be changed to suit the most convenient operation of the machine and film according to the conditions and requirements that may be desired. This provides for the use of one electric motor or other type of prime mover operating at a constant speed to secure the operation of the various mechanisms of the machine.

Where the lead strip, as described above, is not used, the back of the film is provided with an opaque coating of soluble material. This provides for winding several layers of film on the exposed film so that an amount of exposed film containing photographs to be developed may be removed from the camera without becoming light struck. The opaque coating is dissolved off the film during the developing process in a manner well known in the art. The higher speed of winding is used with this opaque backed film to wind a portion of the film whenever it is to be removed from the camera in addition to the part wound to initially thread the film in the camera.

The invention claimed is:

1. In a document photographing machine, the combination of a camera, film feeding means in said camera, document feeding means for feeding documents through the focal plane of said camera, drive means, a first driven means operated by said drive means, a second driven means operated by said drive means to move at a greater speed than said first driven means, normal operating means including a document controlled clutch for operatively connecting said film feeding means and said document feeding means to said first driven means, and manually operable means for disconnecting said film feeding means from said first driven means and for operatively connecting said film feeding means to said second driven means.

2. In a document photographing machine, the combination of a camera, film feeding means for said camera, document feeding means for feeding documents through the focal plane of said camera, drive means, a first driven means operated by said drive means, a second driven means operated by said drive means to move at a greater speed than said first driven means, a document controlled clutch for operatively connecting said document feeding means to said first driven means, normal operating means for operatively connecting said film feeding means to said document feeding means for operation in timed relation therewith, and manually operable means for disconnecting said film feeding means from said document feeding means and for operatively connecting said film feeding means to said second driven means.

RAYMOND M. HESSERT.